Patented Oct. 12, 1948

2,451,432

UNITED STATES PATENT OFFICE 2,451,432

HIGH MOLECULAR GUANAMINES AND A PROCESS FOR THEIR MANUFACTURE

Jakob Bindler, Basel, Switzerland, assignor to J. R. Geigy A. G., Basel, Switzerland, a Swiss firm No Drawing. Application August 24, 1942, Serial No. 455,957. In Switzerland August 18, 1941

Section 1, Public Law 690, August 8, 1946
Patent expires August 18, 1961

7 Claims. (Cl. 260—249.5)

It has been found that high molecular acyl biguanides which have been described as intermediate products for the production of water-soluble derivatives, can be converted into the corresponding guanamines, with an excellent yield, by heating to temperatures above 170° C.

For the condensation which takes place with ring closure and water separation for example the acylbiguanides according to the following formula come into consideration:

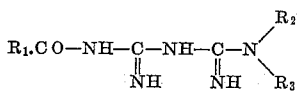

In this $R_1$ indicates a high molecular aliphatic radical with 8–18 carbon atoms and $R_2$ and $R_3$ represent hydrogen or aliphatic, araliphatic, aromatic, hydroaromatic or hetero-cyclic radicals, which may also belong to the same ring system.

Also the derivatives of the acylbiguanides of the above formula come into consideration, in which the hydrogen atoms of the basic nitrogen atoms are replaced wholly or partly by alkyl and/or aralkyl radicals.

The high molecular acylbiguanides, serving as starting materials, may be produced according to the usual process. For example dicyanodiamide may be acylated with the carboxylic acids coming into question and the acylbiguanides be produced from the acylated cyanoguanidines thus obtained, by means of ammonia or suitable organic bases or their salts. Compounds with similar or corresponding properties are obtained, when ammonia, organic amines or their salts are first caused to react with dicyanodiamide by addition and the acylation is carried out afterwards. The acylbiguanides thus obtained may still be alkylated or aralkylated up to the tertiary stage. It is even possible to start with alkylated intermediate products, for example to methylate dicyanodiamide with dimethyl sulfate, then effect acylation and thereupon to react with an amine by addition.

For the acylation high molecular aliphatic carboxylic acids, which according to the definition must contain 9–19 carbon atoms, or their functional derivatives come into consideration. Pelargonic acid, capric acid, palm nut fatty acid, lauric acid, stearic acid, palmitic acid, myristic acid, oleic acid and so on may be mentioned. Instead of pure acids also mixtures thereof come into consideration.

As organic bases for the addition come into consideration primary or secondary, saturated or unsaturated aliphatic, aliphatic-araliphatic, aliphatic-aromatic, aliphatic-hydroaromatic, araliphatic, araliphaticaromatic, araliphatic-hydroaromatic, aromatic, hydroaromatic and heterocyclic mono- and poly-amines or their derivatives substituted by hydroxyl, O-alkyl, halogen, —COOH, —SO$_3$H. There may be enumerated: methyl-, ethyl-, ethanol-, propyl-, butyl-, amyl-, allyl-amine, the corresponding simple and mixed substituted dialkyl amines, alkyl benzyl amines such as methyl- and ethyl-benzyl amine, alkyl phenyl amines such as methyl-, ethyl-aniline, -o-toluidine, -xylidine (mixture); alkylcyclohexyl amines such as N-methyl cyclohexyl amine and so on; benzyl amine, chlorobenzyl amine, benzyl aniline, benzyl-m-toluidine, benzyl-cyclohexyl amine, aniline, toluidines, or xylidines and mixtures thereof, p-aminodimethyl- and ethyl-aniline, o-, m- and p-phenylene diamine, cyclohexyl amine, C-methyl cyclohexyl amine, piperidine and morpholine.

For the alkylation or aralkylation the usual agents come into consideration such as dialkyl sulfates, alkyl halides, alkylene oxides, halogen hydrines, toluene sulfonic acid esters and so forth.

The starting materials may, as is known, be produced in the presence or absence of solvents or diluents and frequently advantageously in the presence of indifferent gases such as CO$_2$, N$_2$, etc.

For the ring closure, heating to temperatures above 170° C. is necessary as mentioned. Between 190° and 210° C. the water separation takes place best, but even higher temperatures can be used, for example 250°–260° C., but the reaction products are discolored with an increased higher temperature. The addition of diluents, for example those which form azeotropic mixtures with the reaction water is recommended in individual cases, but in general the simple and undiluted heating of the high molecular acylbiguanides suffices.

By conversion into water-soluble derivatives for example by exhaustive alkylation, hydroxalkylation, aralkylation or sulfonation with sulfuric acid, oleum, chlorosulfonic acid, even in the presence of phosphorus halides, sulfur chlorides or organic solvents such as ether, pyridine or acetic acid anhydride and so on, valuable capillary-active compounds are formed from the guanamine derivatives. Amongst other things these may serve as textile auxiliary agents, thus for example as stripping agents and levelling agents in vat dying, and as softening agents and water fastness improvers; but they may also be used as washing, emulsifying, dispersing and wetting agents, in which connection the insensitiveness to calcium and the solvent and emulsifying property for calcium soap is worthy of mention.

It is known to produce guanamines by heating salts of fatty acids of guanidine or biguanide. The reaction to some extent is only successful with low fatty acids, with the increase of the carbon atom number of the fatty acids used its course is more unsatisfactory. As the highest acid oenanthylic acid still yields a guanamine according to statements in technical literature. Furthermore it is known to convert biguanide with benzoyl chloride in the presence of caustic soda. A control-work also showed here that the yields of phenyl guanamine are extremely poor. The remaining guanamine-forming reactions, known from literature, are not practical technically, as they start from expensive, complicated compounds such as amidines or nitriles.

It has recently been proposed to produce guanamines by reacting biguanides with carboxylic acid halides in the presence of non-caustic alkalies. The course of this reaction is entirely smooth and easy at temperatures of about 110°–120° C. No intermediate products are noticed.

Theoretically the guanamine formation should take place through the corresponding acylbiguanides. It has however been found that the known high molecular acylbiguanides do not form any trace of guanamine at temperatures of 110°–120° C. For their production heating to 130°–160° C. may be effected without the occurrence of ring formation. In a surprising manner the guanamine formation takes place at temperatures above 170° C., preferably at 190°–210° C.; this is the more surprising as it is known from technical literature that salts of guanidines or biguanides and acids, containing more than 8 C-atoms, do not in fact form guanamines when heated. In contrast with the formation of guanamines from biguanides, acid halides and non-caustic alkalis there is also obtained the substantial advantage that for the production of the acyl biguanides, serving as starting materials, it is possible to use the free acids themselves instead of the expensive acid halides. Furthermore the entire reaction, starting for example from the dicyano diamide, can be carried out in one step to guanamine.

The present invention is illustrated, but not limited, by the following examples, the parts being by weight.

*Example 1a*

94 parts of stearoyl-xylyl-biguanide, produced by heating stearic acid and dicyanodiamide for 12 hours in vacuo and reacting the stearoylcyanoguanidine with a xylidine mixture for 12 hours at 130°–140° C. in the presence of carbon dioxide, are heated for 12 hours to 190°–200° C. whilst stirring. The initial thick paste becomes thinly liquid on the continuance of the reaction. After cooling a bright, brittle mass is obtained.

*Example 1b*

15 parts of the compound obtained according to Example 1a are dissolved in 30 parts of sulfuric acid monohydrate and sulfonated at 0°–5° C. with 30 parts of 26% oleum up to water solubility. As soon as this occurs it is poured on ice water. The separated sulfonic acid is filtered off, neutralised with a solution of caustic soda and the sodium salt evaporated to dryness. It possesses excellent capillary-active properties and can be used both as calcium soap solvent or emulsifier and also as washing agent.

*Example 2a*

88.5 parts of lauroyl-N-isopropylxylyl-biguanide, which may be obtained by heating lauroyl-cyanoguanidine with a mono propylated xylidine mixture, as indicated in Example 1a, are heated to 180°–220° C., whilst stirring, until the completion of water separation. After cooling an almost colorless brittle mass is obtained.

*Example 2b*

When the guanamine compound, obtained according to the above particulars, is sulfonated as indicated in Example 1b, a sodium salt of the sulfonic acid is obtained which possesses practically the same properties as the compound according to Example 1b.

*Example 3a*

41 parts of stearoyl-hydroxyethyl-biguanide, which can be produced in the known manner by reacting dicyano-diamide with stearic acid chloride at between 70° and 120° C. in chloro-benzene and the addition of mono ethanol amine at 130°–140° C., but also by reacting dicyanodiamide with free stearic acid in vacuo and the addition of mono ethanol amine, are heated for about 12 hours to 190°–210° C. whilst stirring. At the conclusion a yellowish, easily pulverisable mass is obtained.

*Example 3b*

15 parts of the guanamine compound, produced according to Example 3a, are dissolved in 250 parts of chlorobenzene, treated with 13 parts of anhydrous sodium carbonate and 14 parts of dimethyl sulfate and heated for 6 hours to 100°–110° C. After removing the inorganic salts and expelling the solvent, a brown mass, soluble in acids, remains. 14 parts of this methylated compound are heated to 60°–65° C. with 8 parts of dimethyl sulfate until water solubility occurs. The quaternary compound is excellently suitable for softening textiles.

*Example 4a*

44 parts of stearoyl-phenyl biguanide (or equivalent parts of the hydrochloride thereof), produced by heating dicyanoamide first with stearic acid and then with aniline (or aniline salts, such as aniline hydrochloride) or by acylating phenyl biguanide with free stearic acid in vacuo, are cyclised by heating to above 170° C., preferably at 200° C. A practically colorless brittle mass is formed which, should it contain acid, may be converted into the free base by neutralisation.

*Example 4b*

64 parts of the guanamine derivative obtained according to Example 4a are methylated in chlorobenzene with 35 parts of anhydrous sodium carbonate and 38 parts of dimethyl sulfate according to Example 3b. A wax-like brown mass remains.

15 parts of this compound are dissolved in 30 parts of sulfuric acid monohydrate and sulfonated with 15 parts of 26% oleum at 0°–5° C. until a sample is clearly soluble in a dilute sodium carbonate solution. When this has occurred it is poured on ice and the separated sulfonic acid is filtered off. By conversion into the sodium salt a bright powder is formed which is particularly suitable for use as levelling and stripping agent in vat dyeing.

Example 5a 104 parts of the reaction mixture of 24 parts of mono methyl aniline and 80 parts of a methylated stearoylcyanoguanidine, (produced by reacting stearic acid with dicyanodiamide and methylating the stearoylcyanoguanidine according to the following prescription: 175 parts of stearoylcyanoguanidine are first heated to 40°–50° C., finally for 16 hours to 110°–120° C., in chlorobenzene with 126 parts of dimethyl sulfate and 106 parts of anhydrous sodium carbonate, the salts are filtered off and the whole is evaporated in vacuo), which has been heated for 18 hours to 130°–140° C. in a $CO_2$ atmosphere, are then heated directly to 190°–210° C. until the water separation has finished. A semi-solid mass is obtained which solidifies on standing.

Example 5b 30 parts of the guanamine compound obtained according to Example 5a are sulfonated as in Example 4b. The neutralised final product possesses the same properties as the sodium salt according to Example 4b.

Example 6a 92 parts of stearoyl-benzyl-biguanide made by heating for 12 hours stearic acid and dicyanodiamide in vacuo and converting the so-obtained stearoyl cyanoguanidine with benzylamine, are heated during 6 to 8 hours, while stirring, to 190°–200° C. After solidifying there is obtained a brittle mass which may easily be pulverised.

Example 6b 15 parts of the compound obtained according to Example 6a are dissolved in 30 parts of monohydrate and sulfonated at 0°–5° C. with 30 parts of 26% oleum and 15 parts of 66% oleum, until water solubility is reached. As soon as this is the case the whole mixture is poured on icewater. The sulfonic acid is then filtered off, it is neutralised with caustic soda lye and the sodium salt evaporated to dryness. It possesses excellent capillary-active properties and can be used as calcium soap solvent or emulsifier as well as washing agent.

Example 7a 44 parts of a condensation product, produced from stearoyl-cyanoguanidine and morpholine by heating for 6 hours up to 130 C. and subsequent raising of the temperature to 190°–200° C. are dissolved in 300 parts of chlorobenzene, then treated with 39 parts of dimethyl sulfate and 32 parts of sodium carbonate and heated for 6 hours up to 100° C. After removing the inorganic salts and expelling the solvent, a brown mass remains which is soluble in acids.

Example 7b 15.5 parts of the methylated base obtained according to Example 7a are heated at 60°–65° C. with 6 parts of dimethyl sulfate, until water solubility occurs. The quaternary compound is very suitable for softening textiles.

Instead of the high molecular acyl biguanides used in the above examples it is possible to use equally well those which are produced from mixtures of the fatty acids, such as are contained in the naturally occurring fats, oils and waxes instead of from the pure lauric and stearic acids. There may be mentioned palm nut fatty acid, train-oil fatty acid, cotton seed oil fatty acid and so forth. There may be mentioned as further fatty acids: oleic acid, palmitic acid, myristic acid or the over acids or their mixtures mentioned in the general part of the present specification.

As biguanides there come into consideration for the production of the acyl compounds: biguanide, methyl-, ethyl- and butyl-biguanide, p-chlorophenyl-, o- and p-tolyl-, anisidyl-, cyclohexyl- and piperidyl-biguanide, but also nitro- and amino-phenyl biguanides, as well as amino and alkyl aminoalkyl biguanides, for example diethyl amino-ethyl biguanide come into question.

As starting materials there further come into consideration for example the following known compounds: lauroyl-o-tolyl biguanide, lauroyl-p-methoxy-phenyl biguanide, lauroyl-o-, -m-, and p-ethoxyphenyl biguanide, lauroyl - tri - aminotriethylene biguanide, stearoyl-N-methyl-phenyl biguanide, stearoyl-m-xylyl-biguanide, stearoyl-amino-ethylene biguanide and their partially alkylated, especially methylated derivatives, lauroyl-dihydroxyethyl biguanide or the acyl biguanides capable of being produced from the remaining components mentioned in the general part of the present specification.

What I claim is:

1. A process for the manufacture of a high molecular guanamine which comprises heating an acyl biguanide of the formula

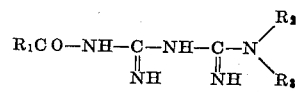

wherein $R_1$ represents an alkyl radical containing from 8 to 18 carbon atoms, $R_2$ represents a member of the group consisting of alkyl, aralkyl, aryl, cycloakyl and heterocyclic radicals, and $R_3$ represents a member of the group consisting of hydrogen and alkyl, aralkyl, aryl, cycloakyl and heterocyclic radicals, to a temperature above 170° C.

2. A process for the manufacture of a high molecular guanamine which comprises heating a compound of the formula

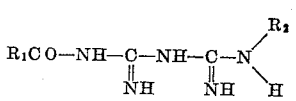

wherein $R_1$ represents an alkyl radical containing from 8 to 18 carbon atoms, and $R_2$ represents monocyclic aryl, to a temperature above 170° C.

3. A process for the manufacture of a high molecular guanamine which comprises heating a compound of the formula

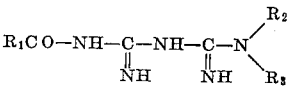

wherein $R_1$ represents an alkyl radical containing from 8 to 18 carbon atoms, $R_2$ represents a member of the group consisting of alkyl, aralkyl, aryl, cycloakyl and heterocyclic radicals, and $R_3$ represents a member of the group consisting of hydrogen and alkyl, aralkyl, aryl, cycloakyl and heterocyclic radicals, to a temperature above 170° C., and converting the resultant guanamine into a water-soluble product by the introduction thereinto of a water-solubilizing group selected from the class consisting of quaternary amino groups and sulfonic acid groups.

4. A process for the manufacture of a high molecular guanamine which comprises heating a compound of the formula

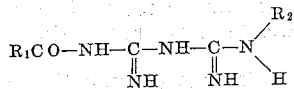

wherein $R_1$ represents an alkyl radical containing from 8 to 18 carbon atoms, and $R_2$ represents monocyclic aryl, to a temperature above 170° C., alkylating the resultant guanamine with a member selected from the class consisting of alkylating and aralkylating agents, and converting the resultant alkyl-guanamine into a water-soluble product by the introduction thereinto of a water-solubilizing group selected from the class consisting of quaternary amino groups and sulfonic acid groups.

5. A process for the manufacture of a high molecular guanamine sulfonic acid, which comprises heating stearoyl-xylyl-biguanide to about 190–200° C., and sulfonating the resultant guanamine with a mixture of sulfuric acid and fuming sulfuric acid.

6. A process for the manufacture of a water-soluble high molecular methylated guanamine, which comprises heating stearoyl-hydroxyethyl-biguanide to about 190–210° C., and polymethylating the resultant guanamine with dimethyl sulfate.

7. A process for the manufacture of a high molecular guanamine sulfonic acid, which comprises heating stearoyl-phenyl-biguanide to about 200° C., methylating the resultant guanamine with a molecular quantity of dimethyl sulfate, and sulfonating the resultant methyl guanamine with a mixture of sulfuric acid and fuming sulfuric acid.

JAKOB BINDLER.

REFERENCES CITED

The following references are of record in the file of this patent:

UNITED STATES PATENTS

| Number | Name | Date |
|---|---|---|
| 2,251,234 | Swain | July 29, 1941 |
| 2,381,121 | Ericks | Aug. 7, 1945 |

FOREIGN PATENTS

| Number | Country | Date |
|---|---|---|
| 540,651 | Great Britain | Oct. 24, 1941 |
| 520,394 | Great Britain | 1940 |

OTHER REFERENCES

Haaf J. Prakt. Chem., 2 (43), pp. 75–85.
Berichte de deut. Chem., 34, pp. 2594–2601.
Berichte de deut. Chem., 25, pp. 525, 542.
Monatschefte fur Chemie, 48, pp. 147–153.
Bul. Intern. Acad. Science Cracovi (1907), pp. 18 and 19.